T. W. MORRIS.
TRIMMING DEVICE.
APPLICATION FILED JULY 31, 1917.
1,361,531.
Patented Dec. 7, 1920.
2 SHEETS—SHEET 2.
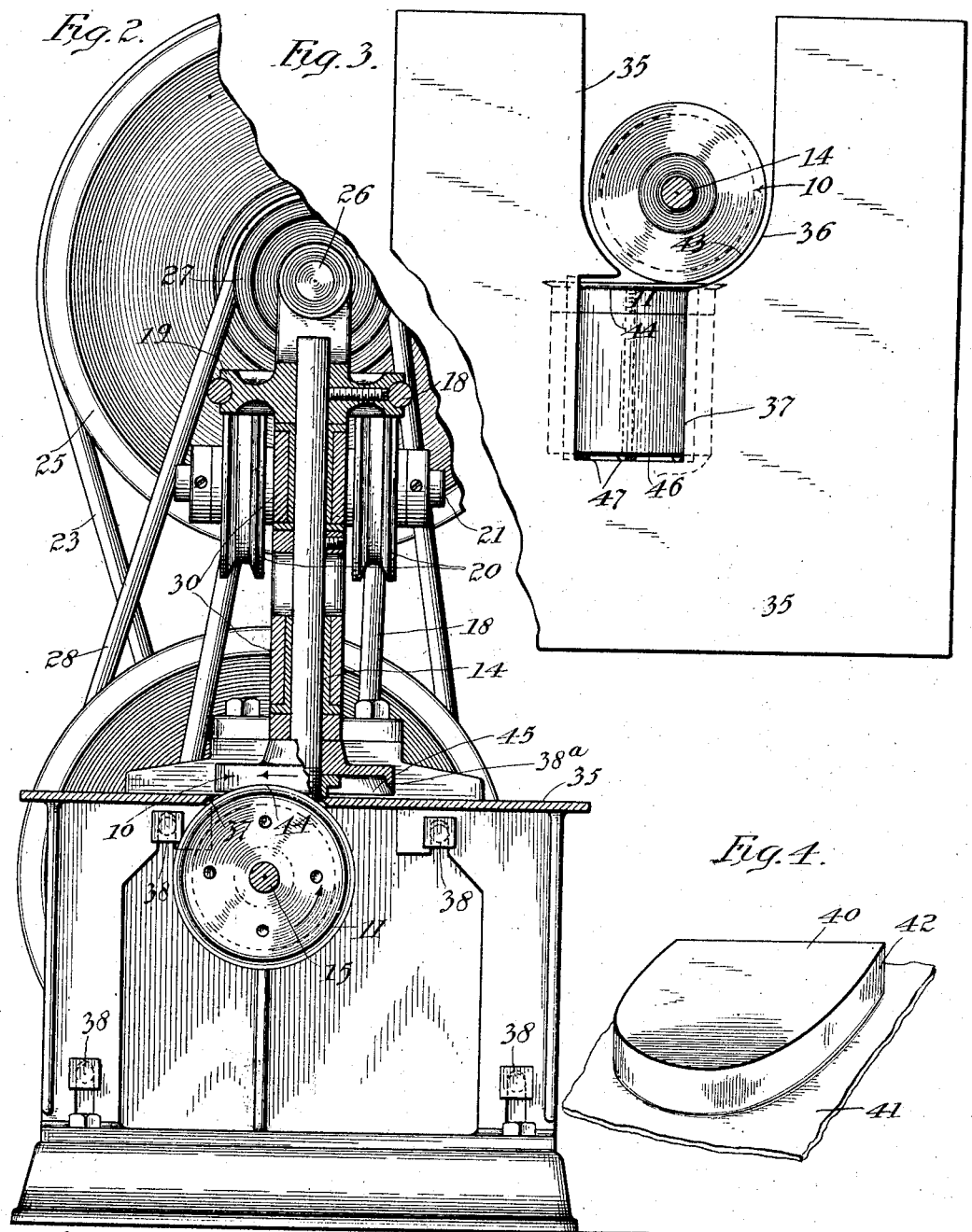

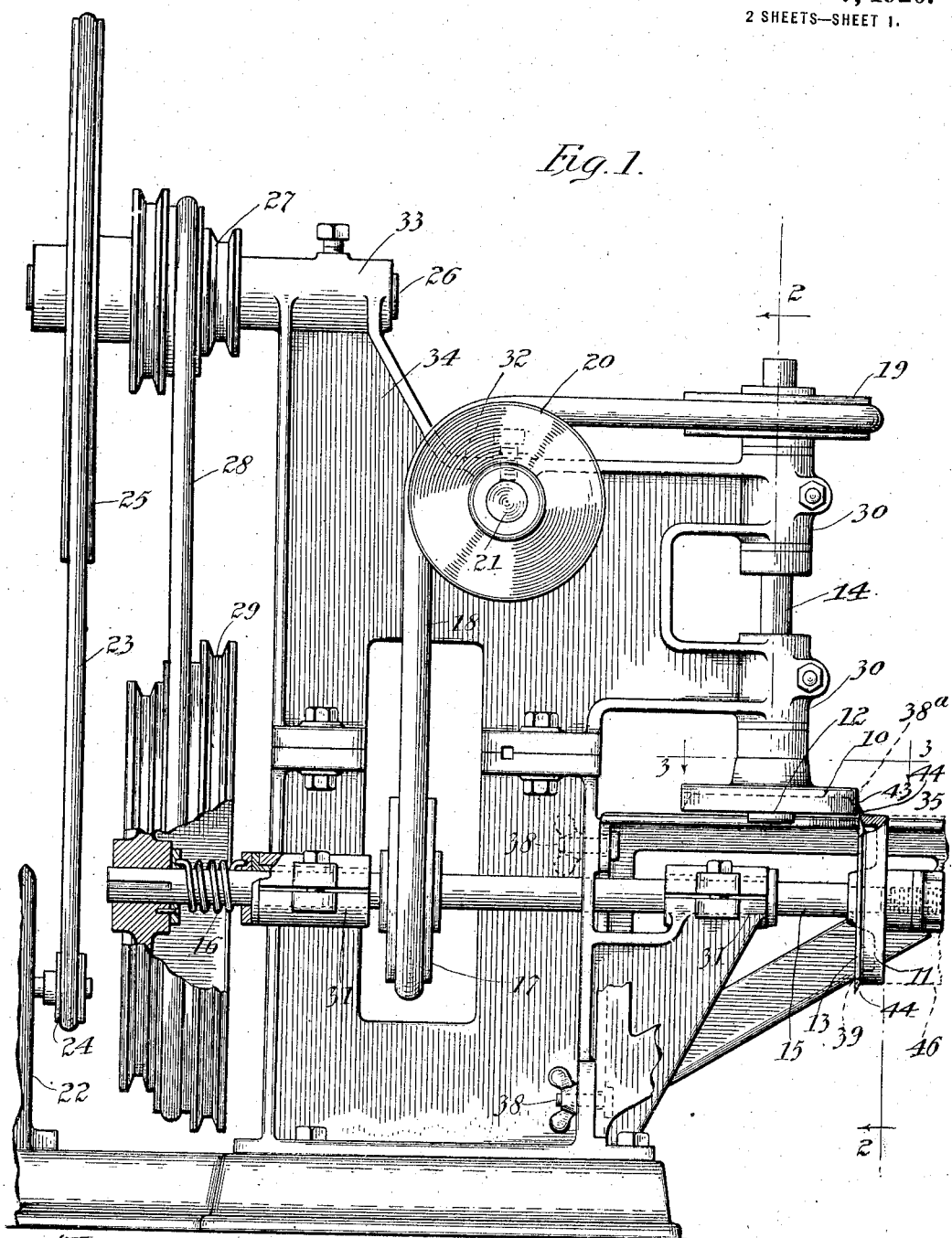

UNITED STATES PATENT OFFICE.

THOMAS W. MORRIS, OF CHICAGO, ILLINOIS.

TRIMMING DEVICE.

1,361,531.  Specification of Letters Patent.  Patented Dec. 7, 1920.

Application filed July 31, 1917. Serial No. 183,689.

*To all whom it may concern:*

Be it known that I, THOMAS W. MORRIS, a citizen of the United States, residing at Chicago, in the county of Cook and State of Illinois, have invented new and useful Improvements in Trimming Devices, of which the following is a full, clear, concise, and exact description, reference being had to the accompanying drawing, forming a part of this specification.

My invention relates to a trimming device.

One of the objects of my invention is to provide an improved trimming device for trimming off the overflow or fin which is formed in molding rubber articles, such as rubber soles and heels. Further objects will appear from the detailed description to follow and from the appended claims.

In the drawings, in which one embodiment of my invention is shown—

Figure 1 is a side elevation of a trimming machine embodying my invention;

Fig. 2 is a section substantially on the line 2—2 of Fig. 1;

Fig. 3 is a horizontal section substantially on the line 3—3 of Fig. 1; and

Fig. 4 is a perspective view of a rubber heel showing the overflow or fin which is to be trimmed off.

Referring now to the drawings in detail, the trimming machine shown comprises two rotatable cutting members 10 and 11, respectively, having circular cutting edges 12 and 13, respectively, lying in different non-parallel planes, the intersection of which planes forms a chord of the circular cutting edge 13. The rotatable members 10 and 11 are mounted on shafts 14 and 15, respectively, the axes of which do not intersect, as shown in Fig. 2, whereby the circular cutting edge of the cutter 11 touches the circular cutting edge of the cutter 10, as will appear from a study of the position of the cutters as shown in Figs. 1, 2, and 3. The cutting edge 13 is yieldingly pressed toward the cutting edge 12 by means of a compression spring 16 surrounding the shaft 15.

The shaft 14 is driven from the shaft 15 by means of a pulley 17 secured on the shaft 15, a belt 18 driven from the pulley 17, and a pulley 19 secured on the shaft 14. The belt 18 runs over a pair of idler pulleys 20 rotatably mounted on a shaft 21 for changing the direction of the belt 18.

The shaft 15 may be driven from any suitable source of power, as motor 22 (Fig. 1), by means of a belt 23 driven from the motor pulley 24, a pulley 25 driven from the belt 23, a shaft 26 to which the pulley 25 is secured, a stepped pulley 27 secured to the shaft 26, a belt 28 driven from the pulley 27, and a stepped pulley 29 driven from the belt 28 and secured to the shaft 15.

The shafts 14, 15, 21 and 26 are mounted in suitable bearings 30, 31, 32 and 33, respectively, in the frame 34 of the machine. A suitable supporting table 35 may be secured to the frame 34 for supporting the material which is being operated upon by the rotatable cutter members 10 and 11. This table 35 is recessed at 36 to accommodate the cutter 10, and is also recessed at 37 to accommodate the cutter 11. The table 35 may be secured to the frame 34 in any suitable manner, as by means of bolts 38.

The lower face of the cutter 10 is cut back, as indicated at 38$^a$ to provide a sharp cutting edge, and the inner face of the cutter 11 is cut back as indicated at 39 to provide a sharp cutting edge.

In using the trimming machine the article or material to be operated upon, such as a molded rubber heel 40, shown in Fig. 4, having an overflow or fin 41 as a result of the method of manufacture, is placed on the table 35 with the overflow or fin 41 in the lower side. The operator then brings the heel 40 up to the cutters 10 and 11 to trim off the fin or overflow 41. In trimming off this fin the side face 42 of the heel 40 is held against the cylindrical surface 43 of the cutter 10, which thus forms a guide in trimming off the fin 41.

Due to the fact that the upper edge 44 of the cutter 11 extends up above the lower edge 45 of the cutter 10, and to the fact that the axis of the cutter 11 is offset with respect to the axis of the cutter 10, there is a true shearing action between the cutters 10 and 11. The construction is such that the cutters 10 and 11 are rotated at the same speed. The speed of the cutters may be changed by shifting the belt 28 from one step to another of the stepped pulleys 27 and 29.

In trimming a rubber heel such as shown in Fig. 4, the table 35 may be removed and the article held between the thumb and forefinger the article being grasped near its center. The action of the cutters 10 and 11 is then such as to cause the side face 42 of the heel to hug the cylindrical surface 43 of the cutter 10, as the cutters draw the overflow 41 in between their cutting edges.

In trimming a larger article, such as the sole of a shoe, the table 35 is used and an extension roller 46 may be secured to the cutter 11 by means of screws 47, to act as an additional feeding means for the article to be trimmed.

What I claim as new and desire to secure by Letters Patent of the United States is:

1. A shearing device comprising a first rotatable member having a circular shearing edge the center of which is in the axis of said member and the plane of shear of which is substantially parallel to said axis, and a second rotatable member having a circular shearing edge the center of which is in the axis of said second member and the plane of shear of which is substantially perpendicular to said second member, said shearing edges engaging each other and lying in different non-parallel planes, the intersection of said planes being a chord of one of said circles, said shearing edges touching each other at their outermost peripheries.

2. A shearing device comprising a first rotatable member having a circular shearing edge the center of which is in the axis of said member and the plane of shear of which is substantially parallel to said axis, and a second rotatable member having a circular shearing edge the center of which is in the axis of said second member and the plane of shear of which is substantially perpendicular to said second member, said shearing edges engaging each other and lying in different non-parallel planes, the intersection of said planes being a chord of one of said circles, said rotatable members having non-intersecting axes.

3. A shearing device comprising a rotatable member having a substantially cylindrical guiding surface terminating in a circular shearing edge having its center in the axis of said member and its plane of shear substantially parallel to said axis, and a second rotatable member having a circular shearing edge lying in a plane non-parallel to the plane of said first shearing edge and engaging said first shearing edge and having its center in the axis of said second member and its plane of shear substantially perpendicular to said axis, the intersection of the planes of said shearing edges being a chord of one of said circles, said shearing edges touching each other at their outermost peripheries.

4. A shearing device comprising a rotatable member having a substantially cylindrical guiding surface terminating in a circular shearing edge having its center in the axis of said member and its plane of shear substantially parallel to said axis, and a second rotatable member having a substantially cylindrical supporting surface terminating in a circular shearing edge, lying in a plane non-parallel to the plane of said first shearing edge and engaging said first shearing edge and having its center in the axis of said second member and its plane of shear substantially perpendicular to said axis, the intersection of the planes of said shearing edges being a chord of one of said circles, said shearing edges touching each other at their outermost peripheries.

5. A shearing device comprising a first rotatable member having a circular shearing edge the center of which is in the axis of said member and the plane of shear of which is substantially parallel to said axis, and a second rotatable member having a circular shearing edge the center of which is in the axis of said second member and the plane of shear of which is substantially perpendicular to said second member, said shearing edges engaging each other and lying in different non-parallel planes, the intersection of said planes being a chord of one of said circles, and yielding means for causing one of said cutting edges to bear against the other, said shearing edges touching each other at their outermost peripheries.

6. A shearing device comprising a rotatable member having a guiding surface terminating in a circular shearing edge having its center in the axis of said member and its plane of shear substantially parallel to said axis, and a second rotatable member having a circular shearing edge, lying in a plane non-parallel to the plane of said first shearing edge and engaging said first shearing edge and having its center in the axis of said second member and its plane of shear substantially perpendicular to said axis, the intersection of the planes of said shearing edges being a chord of one of said circles, said shearing edges touching each other at their outermost peripheries.

7. A shearing device comprising a rotatable member having a guiding surface terminating in a circular shearing edge having its center in the axis of said member and its plane of shear substantially parallel to said axis, and a second rotatable member having an extended substantially cylindrical supporting surface terminating in a circular shearing edge, lying in a plane non-parallel to the plane of said first cutting edge and engaging said first shearing edge and having its center in the axis of said second member and its plane of shear substantially perpendicular to said axis, the intersection of the planes of said shearing edges being a chord of one of said circles, said shearing edges touching each other at their outermost peripheries.

8. A shearing device comprising a first rotatable member having a circular shearing edge the center of which is in the axis of said member and the plane of shear of which is substantially parallel to said axis, and a second rotatable member having a circular shearing edge the center of which is in the axis of said second member and the plane of shear of which is substantially perpendicular to said second member, said shearing edges engaging each other and lying in different non-parallel planes, the intersection of said planes being a chord of one of said circles, and two shafts on which said rotatable members are mounted, respectively, said shearing edges touching each other at their outermost peripheries.

9. A shearing device comprising a first rotatable member having a circular shearing edge the center of which is in the axis of said member and the plane of shear of which is substantially parallel to said axis, and a second rotatable member having a circular shearing edge the center of which is in the axis of said second member and the plane of shear of which is substantially perpendicular to said second member, said shearing edges engaging each other and lying in different non-parallel planes, the intersection of said planes being a chord of one of said circles, and two shafts on which said rotatable members are mounted, respectively, said shafts having non-intersecting axes.

10. A shearing device comprising a first rotatable member having a circular shearing edge the center of which is in the axis of said member and the plane of shear of which is substantially parallel to said axis, and a second rotatable member having a circular shearing edge the center of which is in the axis of said second member and the plane of shear of which is substantially perpendicular to said second member, said shearing edges engaging each other and lying in different non-parallel planes, the intersection of said planes being a chord of one of said circles, two shafts on which said rotatable members are mounted, respectively, said shafts having non-intersecting axes, and yielding means for causing one of said cutting edges to bear against the other.

11. A shearing device comprising a first rotatable member having a circular shearing edge the center of which is in the axis of said member and the plane of shear of which is substantially parallel to said axis, and a second rotatable member having a circular shearing edge the center of which is in the axis of said second member and the plane of shear of which is substantially perpendicular to said second member, said shearing edges engaging each other and lying in different non-parallel planes, the intersection of said planes being a chord of one of said circles, two shafts on which said rotatable members are mounted, respectively, said shafts having non-intersecting axes, and yielding means for causing one of said cutting edges to bear against the other comprising a coil spring surrounding one of said shafts and exerting endwise pressure thereon.

12. A shearing device comprising a first rotatable member having a circular shearing edge, the center of which is in the axis of said member, and the plane of shear of which is substantially parallel to said axis, and a second rotatable member having a circular shearing edge, the center of which is in the axis of said second member, and the plane of shear of which is substantially perpendicular to said second axis, said shearing edges engaging each other and lying in different non-parallel planes, the intersection of said planes being a chord of one of said circles, said shearing edges touching each other at their outermost peripheries, and a work-supporting cylinder detachably secured to one of said rotatable members.

In witness whereof I have hereunto subscribed my name.

THOMAS W. MORRIS.